(12) United States Patent
Xiao

(10) Patent No.: US 10,788,702 B2
(45) Date of Patent: Sep. 29, 2020

(54) BACKLIGHT MODULE AND METHOD OF SWITCHING LED LIGHT SOURCE GROUPS

(71) Applicant: Wuhan China Star Optoelectronics Technology Co., Ltd., Wuhan (CN)

(72) Inventor: Shiyuan Xiao, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 16 days.

(21) Appl. No.: 16/340,141

(22) PCT Filed: Jan. 2, 2019

(86) PCT No.: PCT/CN2019/070068
§ 371 (c)(1),
(2) Date: Apr. 8, 2019

(87) PCT Pub. No.: WO2020/019678
PCT Pub. Date: Jan. 30, 2020

(65) Prior Publication Data
US 2020/0209684 A1    Jul. 2, 2020

(30) Foreign Application Priority Data
Jul. 26, 2018 (CN) .......................... 2018 1 0830992

(51) Int. Cl.
*G02F 1/13357* (2006.01)
*F21V 8/00* (2006.01)
(52) U.S. Cl.
CPC ..... *G02F 1/133603* (2013.01); *G02B 6/0023* (2013.01); *G02B 6/0043* (2013.01); *G02F 1/133605* (2013.01); *G02F 2001/133613* (2013.01)

(58) Field of Classification Search
CPC ........... G02F 1/133603; G02F 1/33605; G02F 2001/133613; G02B 6/0043; G02B 6/0023
See application file for complete search history.

(56) References Cited

U.S. PATENT DOCUMENTS

2013/0162934 A1    6/2013 Hirayama et al.
2015/0339996 A1*  11/2015 Schuck ............... H04N 13/334
                                                        348/58
2016/0139325 A1    5/2016 Urano et al.
2016/0341875 A1*  11/2016 Chang ................. G02B 6/0068

FOREIGN PATENT DOCUMENTS

CN          102879951            1/2013
CN          104930411 A    *    9/2015
CN          205827019            12/2016
KR    10-2013-0019250            2/2013

* cited by examiner

Primary Examiner — Joseph L Williams
Assistant Examiner — Jose M Diaz

(57) ABSTRACT

A backlight module includes a light guide plate, a light bar substrate, and a plurality of quantum dot layers. The light bar substrate includes a first LED light source group and a second LED light source group. When the first LED light source group is illuminated, light emitted by the first LED light source group falls into the quantum dot layers and enters the light guide plate. When the second LED light source group is illuminated, light emitted by the second LED light source group directly enters the light guide plate without passing through the quantum dot layers, such that a color gamut display state can be switched according to different requirements.

20 Claims, 3 Drawing Sheets

BACKLIGHT MODULE AND METHOD OF SWITCHING LED LIGHT SOURCE GROUPS

RELATED APPLICATIONS

This application is a National Phase of PCT Patent Application No. PCT/CN2019/070068 having International filing date of Jan. 2, 2019, which claims the benefit of priority of Chinese Patent Application No. 201810830992.9 filed on Jul. 26, 2018. The contents of the above applications are all incorporated by reference as if fully set forth herein in their entirety.

FIELD AND BACKGROUND OF THE INVENTION

The present disclosure relates to the field of display technologies, and more particularly to a backlight module and a method of switching light emitting diode (LED) light source groups.

With the development of display technologies, there are more and more applications, user's requirements for display performances also increase, thereof, it is necessary to increase a color gamut value of a display. At present, a high color gamut of display performances is usually achieved by exciting quantum dots to mix into white light, so as to meet application requirements of a high color gamut display.

However, a high color gamut may cause a brightness of a display device to decrease. When the display device performs a high color gamut display, in order to keep the brightness, thereof, it is necessary to increase a power consumption of a backlight module. If a high gamut display state is maintained all the time, the power consumption of the backlight module will be greatly increased, resulting in unnecessary energy waste. However, in people's normal life, a high color gamut display is only used when watching high-definition movies. And in other cases, it is unnecessary to use a high color gamut display, only a conventional gamut display can meet the need. In currently known technologies, there is no free switching between a high color gamut display and a conventional color gamut display.

Therefore, there is a need to provide a new backlight module and a new method of switching LED light source groups to solve the above issues.

SUMMARY OF THE INVENTION

In order to solve the above issues, the present disclosure provides a technical solution as follows.

The present disclosure provides a backlight module. The backlight module includes a light guide plate, a light bar substrate and a plurality of quantum dot layers. The light bar substrate is disposed on a light incident side of the light guide plate. The light bar substrate includes a first light emitting diode (LED) light source group and a second LED light source group. The first LED light source group and the second LED light source group correspond to different color gamut displays and configured to be illuminated. The quantum dot layers are disposed on the light incident side of the light guide plate. When the first LED light source group is illuminated, light emitted by the first LED light source group falls into the quantum dot layers and enters the light guide plate. When the second LED light source group is illuminated, light emitted by the second LED light source group directly enters the light guide plate without passing through the quantum dot layers. A length of the quantum dot layers corresponds to a range of the light emitted by the first LED light source group.

In an embodiment of the present disclosure, the first LED light source group includes a plurality of blue LEDs, and the second LED light source group includes a plurality of white LEDs.

In an embodiment of the present disclosure, the blue LEDs and the white LEDs are arranged at intervals along a same linear direction, and a distance between any adjacent blue LEDs and white LEDs is same.

In an embodiment of the present disclosure, a plurality of the quantum dot layers are arranged at intervals.

In an embodiment of the present disclosure, the first LED light source group and the quantum dot layers are arranged opposite to each other, the second LED light source group and gap sections between the quantum dot layers are arranged opposite to each other.

In an embodiment of the present disclosure, the quantum dot layers are disposed on the blue LEDs.

In an embodiment of the present disclosure, the first LED light source group and the second LED light source group are connected with a flexible circuit board.

In an embodiment of the present disclosure, the quantum dot layers include red quantum dots, green quantum dots, and blue quantum dots.

In an embodiment of the present disclosure, the backlight module further includes an optical film set and a reflective sheet.

The present disclosure further provides a backlight module. The backlight module includes a light guide plate, a light bar substrate and a plurality of quantum dot layers. The light bar substrate is disposed on a light incident side of the light guide plate. The light bar substrate includes a first LED light source group and a second LED light source group. The first LED light source group and the second LED light source group correspond to different color gamut displays and configured to be selectively illuminated. The quantum dot layers are disposed on the light incident side of the light guide plate. When the first LED light source group is illuminated, light emitted by the first LED light source group falls into the quantum dot layers and enters the light guide plate. When the second LED light source group is illuminated, light emitted by the second LED light source group directly enters the light guide plate without passing through the quantum dot layers.

In an embodiment of the present disclosure, the first LED light source group includes a plurality of blue LEDs, and the second LED light source group includes a plurality of white LEDs.

In an embodiment of the present disclosure, a number of the blue LEDs and the white LEDs is determined according to a type of display device and a screen size of applications.

In an embodiment of the present disclosure, the blue LEDs and the white LEDs are arranged at intervals along a same linear direction, and a distance between any adjacent blue LEDs and white LEDs is same.

In an embodiment of the present disclosure, the quantum dot layers are arranged at intervals.

In an embodiment of the present disclosure, the first LED light source group and the quantum dot layers are arranged opposite to each other, the second LED light source group and gap sections between the quantum dot layers are arranged opposite to each other.

In an embodiment of the present disclosure, the quantum dot layers are disposed on the blue LEDs.

In an embodiment of the present disclosure, the first LED light source group and the second LED light source group are connected with a flexible circuit board.

In an embodiment of the present disclosure, the quantum dot layers include red quantum dots, green quantum dots, and blue quantum dots.

In an embodiment of the present disclosure, the backlight module further includes an optical film set and a reflective sheet.

The present disclosure further provides a method of switching LED light source group of a backlight module of a display device, the method of switching LED light source group includes the following steps:

Step S10: a backlight module having a driving circuit, a first LED light source group and a second LED light source group is configured to detect that a demand of a display image displayed by a current display device is a first display state or a second display state. The first LED light source group is configured to operate in the first display state. The second LED light source group is configured to operate in the second display state. And if the current display device detects that the demand of the display image displayed by the current display device is the first display state, a Step S20 is performed. If the current display device detects that the demand of the display image displayed by the current display device is the second display state, a Step S30 is performed;

Step S20: the driving circuit of the backlight module performs a power-on operation on the first LED light source group, and performs a power-off operation on the second LED light source group, and a Step S40 is performed;

Step S30: the driving circuit of the backlight module performs a power-on operation on the second LED light source group, and performs a power-off operation on the first LED light source group, and a Step S40 is performed;

Step S40: the backlight module corresponds to the demand of display image displayed by the current display device. The driving circuit controls the first LED light source group and the second LED light source group.

In the embodiments of the present disclosure, a first LED light source group and a second LED light are disposed on the light bar substrate of the backlight module. A plurality of quantum dot layers are disposed on the light guide plate. The first LED light source group and the second LED light source group correspond to different color gamut displays and are configured to be selectively illuminated, such that users can switch freely between a high color gamut display and a conventional color gamut display according to different requirements. When switching to a high color gamut display, users can obtain high-quality visual enjoyment. When switching to a conventional color gamut display, a power consumption of the backlight module can be decreased. And a performance and a market competitiveness of a product can be improved.

BRIEF DESCRIPTION OF THE SEVERAL VIEWS OF THE DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

DESCRIPTION OF SPECIFIC EMBODIMENTS OF THE INVENTION

Figure 1:
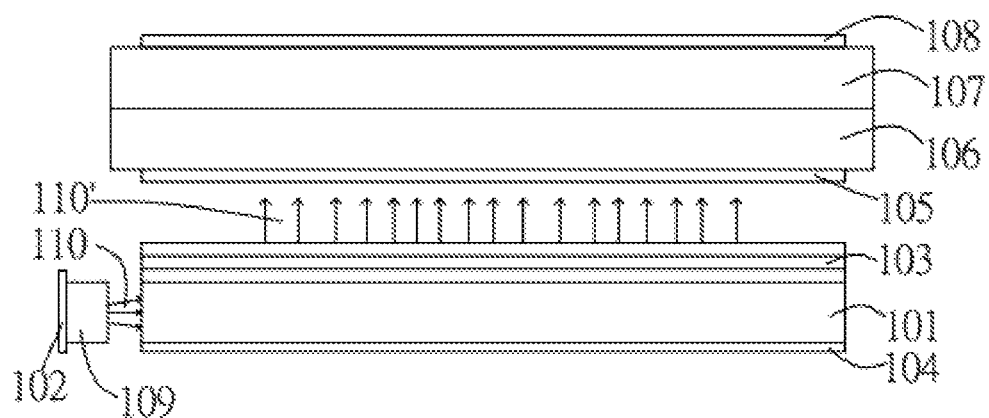
FIG. 1 is a schematic structural diagram of a display device according to an embodiment of the present disclosure.

The following description of the various embodiments is provided to illustrate the specific embodiments. Directional terms described by the present disclosure, such as top, bottom, front, back, left, right, inner, outer, side, vertical, level, etc., are only directions by referring to the accompanying drawings, and thus the used terms are used only for the purpose of describing embodiments of the present disclosure and are not intended to be limiting of the present disclosure. In the drawings, units with similar structures are labeled with the same reference number.

Embodiment 1

FIG. 1 illustrates a schematic structural diagram of a display device according to an embodiment of the present disclosure. Referring to FIG. 1, the display device includes a backlight module and a display module. The backlight module includes a light guide plate 101 and a light bar substrate 102. The light guide plate 101 includes a light incident side 110 and a light exiting side 110'. The backlight module further includes an optical film set and a reflective sheet. The optical film set 103 is disposed on the light exiting side 110' of the light guide plate 101. The optical film set 103 includes a diffusion plate or a prism sheet, etc., capable of guiding light, collecting light, and adjusting a divergence angle of the light. In addition, the reflective sheet 104 is disposed on a side of the light guide plate 101 away from the light exiting side 110'. The display device may be a liquid crystal panel display device or other types of a panel display device.

The display module includes a lower polarizer 105, a thin film transistor (TFT) substrate 106, a color filter (CF) substrate 107, and an upper polarizer 108 disposed from bottom to top.

The light bar substrate 102 includes a light emitting diode (LED) light source 109. Light emitted by the LED light source 109 is first incident from the light incident side 110 of the guide plate 101. A part of the light is emitted from the light exiting side 110' of the light guide plate 101 to the optical film set 103. Another part of the light is reflected by the reflective sheet 104 and then is incident on the light guide plate 101. And after that, the light is emitted from the light exiting side 110' of the guide plate 101 to the optical film set 103. Finally, the light is emitted from the optical film set 103 to the lower polarizer 105, and the light is emitted from the upper polarizer 108 after passing through the thin film transistor substrate 106 and the color film substrate 107 in turn.

Figure 2:
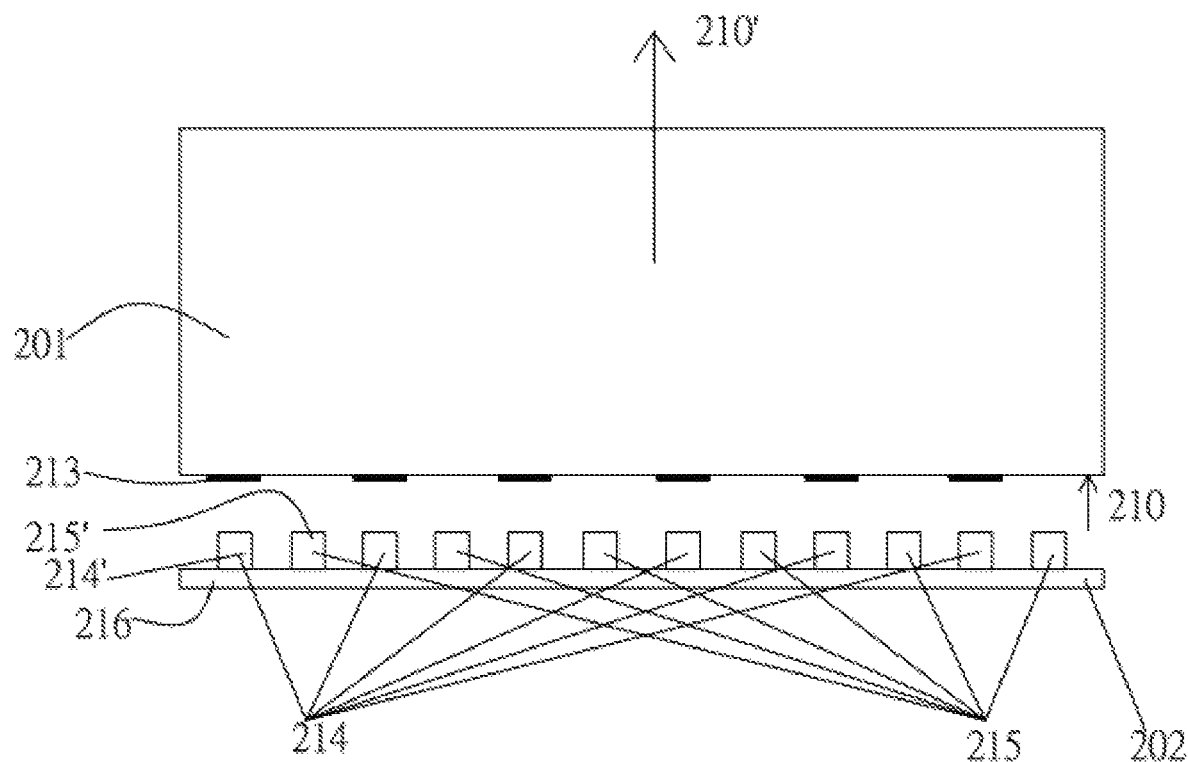
FIG. 2 is a schematic structural diagram of a backlight module according to an embodiment of the present disclosure.

FIG. 2 illustrates a schematic structural diagram of a backlight module according to an embodiment of the present disclosure. Referring to FIG. 2, a high color gamut display can be obtained in various ways in practical applications, currently the most common and widely used way is a combination of blue LEDs and quantum dots. When the quantum dots are irradiated by light with specific wavelength, the quantum dots can emit monochrome light in order to improve the color gamut value of the display device.

The first LED light source group 214 includes a plurality of blue LEDs 214'. The second LED light source group 215 includes a plurality of white LEDs 215'. The blue LEDs 214' and the white LEDs 215' are arranged at intervals along a same linear direction, and a distance between any adjacent blue LEDs 214' and white LEDs 215' is same. This can not only make the first LED light source group 214 and the second LED light source group 215 arranged closely, but also make the blue LEDs 214' and the white LEDs 215' emit more uniform light. A number of the blue LEDs 214' and the white LEDs 215' is determined according to a type of the display device and a screen size of applications. For example, for a high-definition television (TV) with a large screen, a larger number of the blue LEDs 214' and the white LEDs 214' can be arranged. However, for mobile phones and tablets with small screen sizes, a relatively small number of the blue LEDs 214' and the white LEDs 215' can be arranged.

A plurality of quantum dot layers 213 arranged at intervals are disposed on a surface of a light incident side 210 of the light guide plate 201. The quantum dot layers 213 may be disposed on the surface of the light incident side 210 of the light guide plate 201 by coating, evaporation, sputtering, or the like.

The first LED light source group 214 and the quantum dot layers 213 are arranged opposite to each other. The second LED light source group 215 and gap sections between the quantum dot layers 213 are arranged opposite to each other. The quantum dot layers 213 and the gap sections between the quantum dot layers 213 cover the surface of the light incident side 210 of the entire light guide plate 201. A length of the quantum dot layers 213 corresponds to a range of the light emitted by the first LED light source group 214, such that the light emitted by the blue LEDs 214' of the first LED light source group 214 can just fall on the quantum dot layers 213.

For example, a number of the quantum dot layers 213 is same as a number of the blue LEDs 214' so that each individual blue LED 214' corresponds to each individual quantum dot layer 213.

The blue LEDs 214' and the white LEDs 215' are connected with a flexible circuit board 216, which provides a connection with the driving circuit for the on/off operation of the first LED light source group 214 and second LED light source group 215. And the flexible circuit board 216 controls a working state of the first LED light source group 214 and second LED light source group 215.

Figure 3:
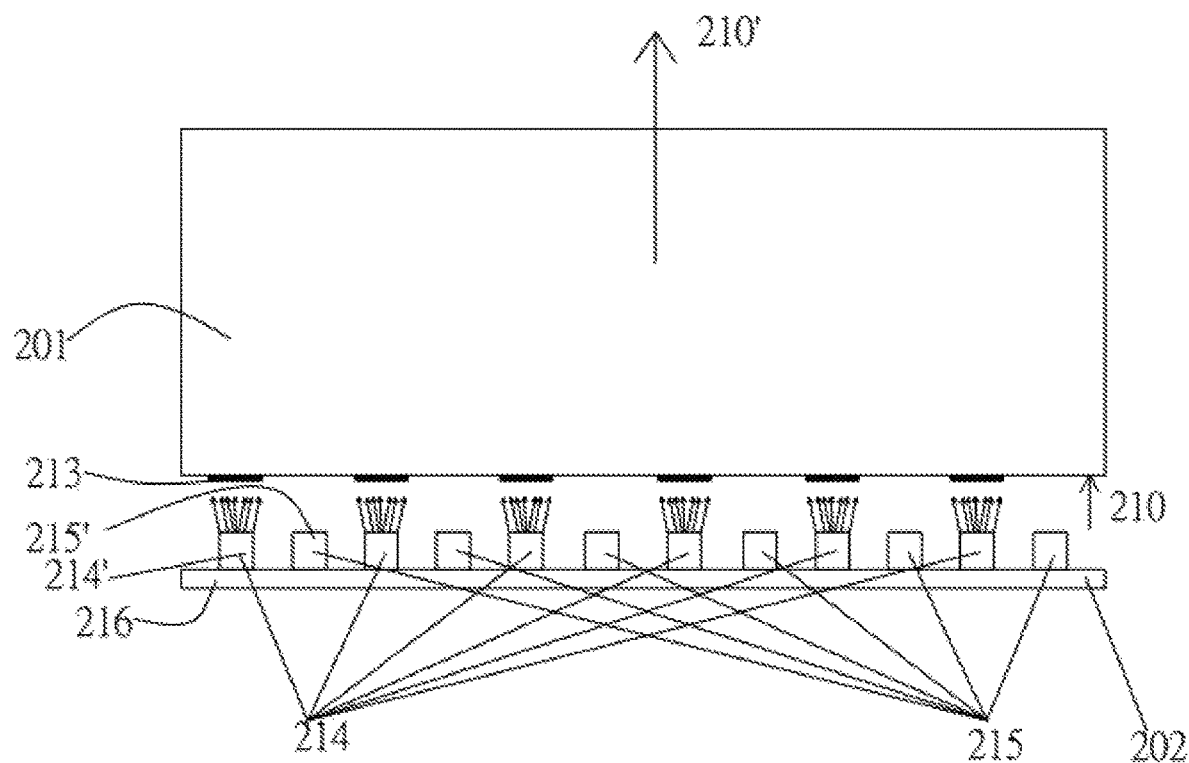
FIG. 3 is a schematic structural diagram of a backlight module in a high color gamut display according to an embodiment of the present disclosure.

FIG. 3 illustrates a schematic structural diagram of a backlight module in a high color gamut display according to an embodiment of the present disclosure. Referring to FIG. 3, when the high color gamut display state is required, only the first LED light source group 214 can be energized to work. The first LED light source group 214 is illuminated. The light emitted by the blue LEDs 214' of the first LED light source group 214 can all fall into the quantum dot layers 213. And the light emitted by exciting the quantum dot layers 213 is mixed with blue light to form white light. After that, the white light falls into the light guide plate 201 to form a high color gamut display screen. The quantum dot layers 213 include red quantum dots, green quantum dots, and blue quantum dots. Preferably, in order to save an amount of the quantum dot layers 213, the quantum dot layers 213 are formed only by mixing the red quantum dots and the green quantum dots. The red quantum dots and the green quantum dots emit red light and green light respectively under the excitation of the blue light which emitted by the blue LEDs 214', and the red light and green light mix with a part of the blue to form white light.

For example, the wavelength of the red quantum dots and the green quantum dots are both greater than the wavelength of the blue quantum dots so that the blue light emitted by the first LED light source group 214 can be mixed with the red light and green light to form the better white light and the higher color gamut. Specifically, an emission wavelength of the blue light emitted by the blue LEDs 214' ranges between 435 nanometers and 455 nanometers. The emission wavelength of the red light ranges between 610 nanometers and 640 nanometers. The emission wavelength of the green light ranges between 510 nanometers and 540 nanometers.

Figure 4:
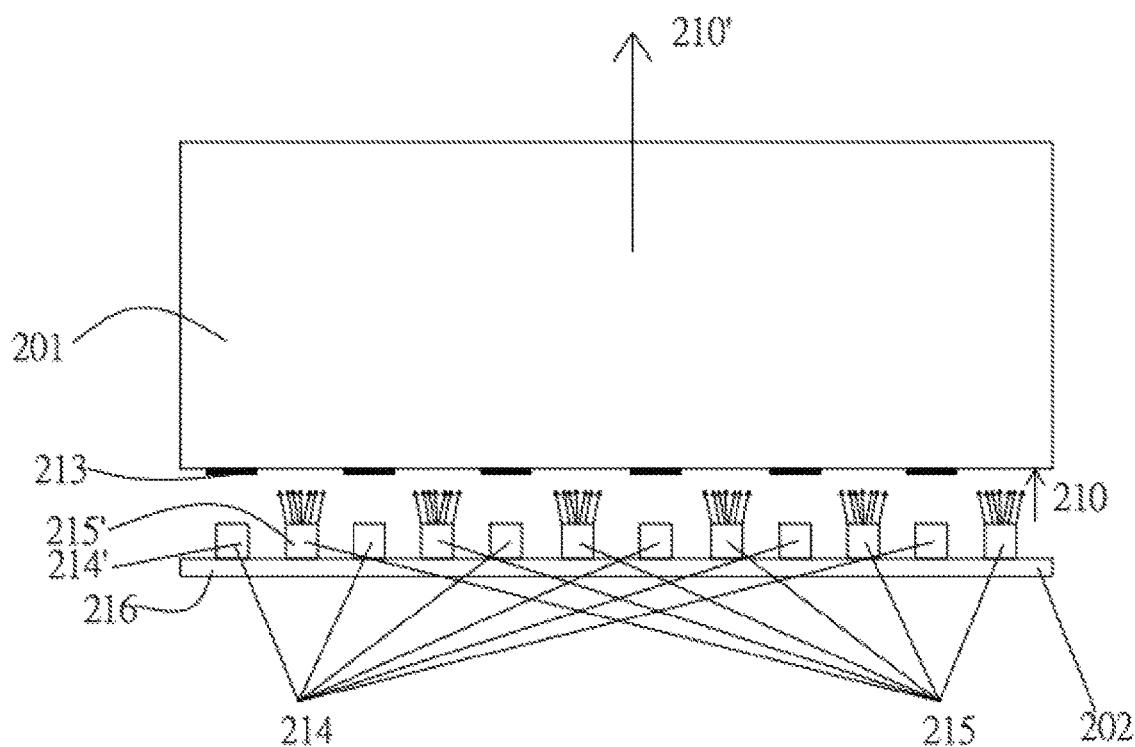
FIG. 4 is a schematic structural diagram of a backlight module in a conventional color gamut display according to an embodiment of the present disclosure.

FIG. 4 illustrates a schematic structural diagram of a backlight module in a conventional color gamut display according to an embodiment of the present disclosure. Referring to FIG. 4, when the high color gamut display state is not required, only the conventional color gamut is required. The first LED light source group 214 can be powered off without working and the second LED light source group 215 can be energized to work. And the second LED light source group 215 is illuminated. The white light emitted by the white LEDs 215' of the second LED light source group 215 all falls into the gap sections between the quantum dot layers 213, and is directly injected into the light guide plate 201 without passing through the quantum dot layers 213 to form the conventional color gamut screen.

Therefore, in this embodiment, the backlight module provides a connection between the first LED light source group 214 and the second LED light source group 215 and the driving circuit though the flexible circuit board 216, which controls the working state of the first LED light source group 214 and the second LED light source group 215 in order to switch freely between the high color gamut display and the conventional color gamut display.

Embodiment 2

FIG. 4 illustrates a schematic structural diagram of a backlight module according to another embodiment of the present disclosure. In addition to the way described in the first embodiment above, in which the quantum dot layers 213 are disposed on the surface of the incident side 210 of the light guide plate 201. The quantum dot layers 213 can be disposed on the blue LEDs of the first LED light source group 214 to solve the technical issue of not being able to switch freely between the high color gamut display and the conventional color gamut display.

Figure 5:
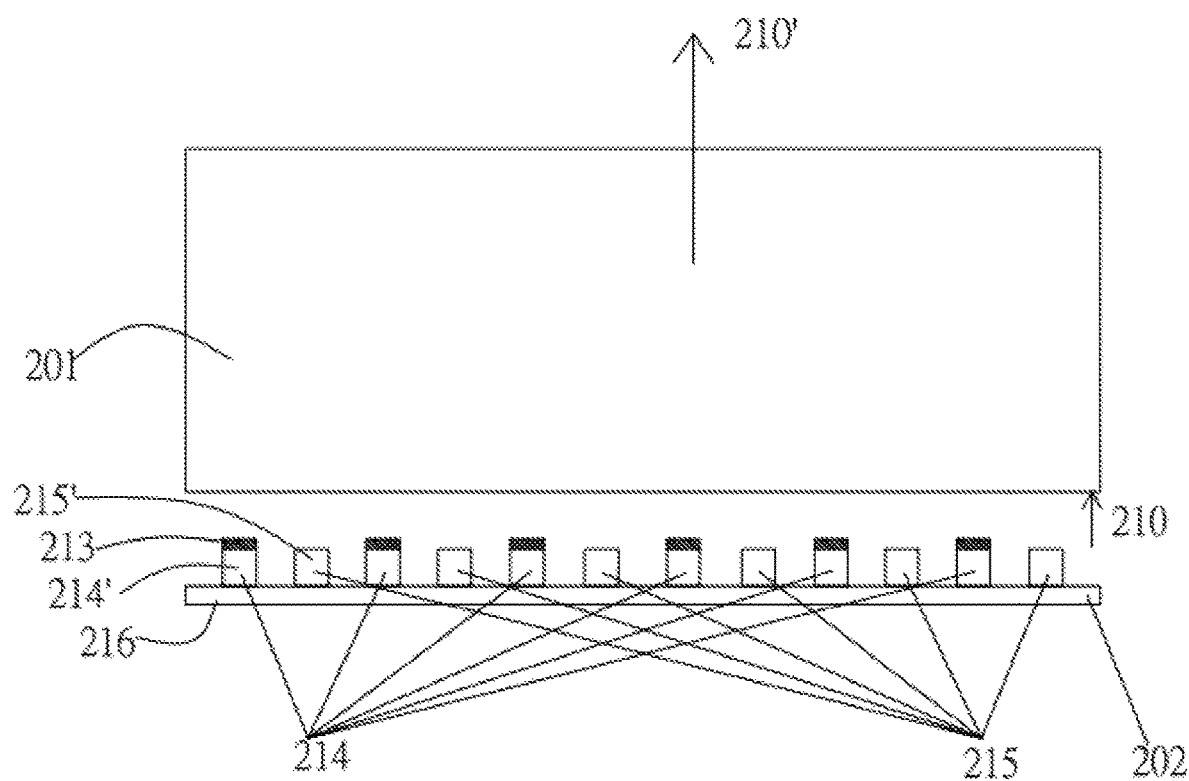
FIG. 5 is a schematic structural diagram of a backlight module according to another embodiment of the present disclosure.

Referring to FIG. 5, the backlight module includes a light guide plate 201 and a light bar substrate 202 disposed on the light incident side 210 of the light guide plate 201. The light bar substrate 202 includes a first LED light source group 214 and a second LED light source group 215. The first LED light source group 214 includes a plurality of blue LEDs 214'. The second LED light source group 215 includes a plurality of white LEDs 215'. The blue LEDs 214' and the white LEDs 215' are arranged at intervals along a same linear direction, and a distance between any adjacent blue LEDs 214' and white LEDs 215' is same. In addition, the quantum dot layers 213 are disposed on a light exit port of the blue LEDs 214' of the first LED light source group 214.

For example, the quantum dot layers 213 can be disposed on a surface of the light exit port of the blue LEDs 214' by coating, evaporation, sputtering, or the like. When only the first LED light source group 214 is energized to work, the first LED light source group 214 is illuminated. Light emitted by the blue LEDs 214' of the first LED light source group 214 can all fall into the quantum dot layers 213. Light emitted by exciting the quantum dot layers 213 is mixed with blue light to form white light. After that, the white light falls into the light guide plate 201 to form a high color gamut display. When it is necessary to switch to a conventional color gamut display, only the second LED light source group 215 can be energized to work. The second LED light source group 215 is illuminated. The white light emitted by the white LEDs 215' is directly injected into the light guide plate 201 without passing through the quantum dot layers 213 to form the conventional color gamut screen.

Therefore, in this embodiment, the backlight module provides a connection between the blue LEDs 214' and the white LEDs 215' and the driving circuit though the flexible circuit board 216, which controls a working state of the blue LEDs 214' and the white LEDs 215' in order to switch freely between the high color gamut display and the conventional color gamut display.

Embodiment 3

The present disclosure further provides a method of switching LED light source group of a backlight module of a display device, wherein the method for switching LED light source group includes the following steps:

Step S10: a backlight module having a driving circuit, a first LED light source group and a second LED light source group is configured to detect that a demand of a display image displayed by a current display device is a first display state or a second display state. The first LED light source group is configured to operate in the first display state. The second LED light source group is configured to operate in the second display state. And if the current display device detects that the demand of the display image displayed by the current display device is the first display state, a Step S20 is performed. If the current display device detects that the demand of the display image displayed by the current display device is the second display state, a Step S30 is performed;

Step S20: the driving circuit of the backlight module performs a power-on operation on the first LED light source group, and performs a power-off operation on the second LED light source group, and S40 is performed;

Step S30: the driving circuit of the backlight module performs a power-on operation on the second LED light source group, and performs a power-off operation on the first LED light source group, and a Step S40 is performed;

Step S40: The backlight module corresponds to the demand of display image displayed by the current display device. The driving circuit controls the first LED light source group and the second LED light source group.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A backlight module, comprising:
a light guide plate, a light bar substrate, and a plurality of quantum dot layers;
wherein the light bar substrate is disposed on a light incident side of the light guide plate, the light bar substrate comprises a first light emitting diode (LED) light source group and a second LED light source group, the first LED light source group and the second LED light source group correspond to different color gamut displays and are configured to be selectively illuminated, the quantum dot layers are disposed on the light incident side of the light guide plate, when the first LED light source group is illuminated, light emitted by the first LED light source group falls into the quantum dot layers and enters the light guide plate, when the second LED light source group is illuminated, light emitted by the second LED light source group directly enters the light guide plate without passing through the quantum dot layers, a length of the quantum dot layers corresponds to a range of the light emitted by the first LED light source group.

2. The backlight module according to claim 1, wherein the first LED light source group comprises a plurality of blue LEDs, and the second LED light source group comprises a plurality of white LEDs.

3. The backlight module according to claim 2, wherein the blue LEDs and the white LEDs are arranged at intervals along a same linear direction, and a distance between any adjacent blue LEDs and white LEDs is same.

4. The backlight module according to claim 1, wherein the quantum dot layers are arranged at intervals.

5. The backlight module according to claim 4, wherein the first LED light source group and the quantum dot layers are arranged opposite to each other, the second LED light source group and gap sections between the quantum dot layers are arranged opposite to each other.

6. The backlight module according to claim 4, wherein the quantum dot layers are disposed on the blue LEDs.

7. The backlight module according to claim 1, wherein the first LED light source group and the second LED light source group are connected with a flexible circuit board.

8. The backlight module according to claim 1, wherein the quantum dot layers comprise red quantum dots, green quantum dots, and blue quantum dots.

9. The backlight module according to claim 1, wherein the backlight module further comprises an optical film set and a reflective sheet.

10. A backlight module, comprising:
a light guide plate, a light bar substrate, and a plurality of quantum dot layers;
wherein the light bar substrate is disposed on a light incident side of the light guide plate, the light bar substrate comprises a first light emitting diode (LED) light source group and a second LED light source group, the first LED light source group and the second LED light source group correspond to different color gamut displays and are configured to be selectively illuminated, the quantum dot layers are disposed on the light incident side of the light guide plate, when the first LED light source group is illuminated, light emitted by the first LED light source group falls into the quantum dot layers and enters the light guide plate, when the second LED light source group is illuminated, light emitted by the second LED light source group directly enters the light guide plate without passing through the quantum dot layers.

11. The backlight module according to claim 10, wherein the first LED light source group comprises a plurality of blue LEDs, and the second LED light source group comprises a plurality of white LEDs.

12. The backlight module according to claim 11, wherein a number of the blue LEDs and the white LEDs is determined according to a type of display devices and a screen size of applications.

13. The backlight module according to claim 11, wherein the blue LEDs and the white LEDs are arranged at intervals along a same linear direction, and a distance between any adjacent blue LEDs and white LEDs is same.

14. The backlight module according to claim 10, wherein the quantum dot layers are arranged at intervals.

15. The backlight module according to claim 14, wherein the first LED light source group and the quantum dot layers are arranged opposite to each other, the second LED light source group and gap sections between the quantum dot layers are arranged opposite to each other.

16. The backlight module according to claim 14, wherein the quantum dot layers are disposed on the blue LEDs.

17. The backlight module according to claim 10, wherein the first LED light source group and the second LED light source group are connected with a flexible circuit board.

18. The backlight module according to claim 10, wherein the quantum dot layers comprise red quantum dots, green quantum dots, and blue quantum dots.

19. The backlight module according to claim 10, wherein the backlight module further comprises an optical film set and a reflective sheet.

20. A method of switching light emitting diode (LED) light source group of a backlight module of a display device, wherein the method of switching LED light source group comprises the following steps:
   Step S10: providing a backlight module having a driving circuit, a first LED light source group, and a second LED light source group configured to detect that a demand of a display image displayed by a current display device is a first display state or a second display state, wherein the first LED light source group is configured to operate in the first display state, the second LED light source group is configured to operate in the second display state, and if the current display device detects that the demand of the display image displayed by the current display device is the first display state, a Step S20 is performed, if the current display device detects that the demand of the display image displayed by the current display device is the second display state, a Step S30 is performed;
   Step S20: the driving circuit of the backlight module performing a power-on operation on the first LED light source group and performing a power-off operation on the second LED light source group, and a Step S40 is performed;
   Step S30: the driving circuit of the backlight module performing a power-on operation on the second LED light source group and performing a power-off operation on the first LED light source group, and the Step S40 is performed;
   Step S40: the backlight module corresponding to the demand of the display image displayed by the current display device, and the driving circuit controlling the first LED light source group and the second LED light source group.

* * * * *